US012749603B2

(12) United States Patent
Fujikawa

(10) Patent No.: US 12,749,603 B2
(45) Date of Patent: Sep. 29, 2026

(54) R-T-B BASED PERMANENT MAGNET AND METHOD FOR MANUFACTURING SAME

(71) Applicant: TDK CORPORATION, Tokyo (JP)

(72) Inventor: Yoshinori Fujikawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 723 days.

(21) Appl. No.: 17/438,796

(22) PCT Filed: Mar. 10, 2020

(86) PCT No.: PCT/JP2020/010320

§ 371 (c)(1),
(2) Date: Sep. 13, 2021

(87) PCT Pub. No.: WO2020/184565

PCT Pub. Date: Sep. 17, 2020

(65) Prior Publication Data

US 2022/0148772 A1 May 12, 2022

(30) Foreign Application Priority Data

Mar. 13, 2019 (JP) ................................. 2019-046401

(51) Int. Cl.
*H01F 1/057* (2006.01)
*B22F 3/24* (2006.01)
(Continued)

(52) U.S. Cl.
CPC ......... *H01F 1/0577* (2013.01); *C22C 38/005* (2013.01); *H01F 41/0293* (2013.01)

(58) Field of Classification Search
None
See application file for complete search history.

(56) References Cited

U.S. PATENT DOCUMENTS 10,096,412 B2 * 10/2018 Kato ..................... H01F 1/0577
2007/0102069 A1 * 5/2007 Hidaka ................. H01F 41/026 148/302

(Continued)

FOREIGN PATENT DOCUMENTS

JP 2005-276949 A 10/2005
JP 2009231391 A * 10/2009

(Continued)

OTHER PUBLICATIONS

Machine translation of JP-2009231391-A. (Year: 2009).*

*Primary Examiner* — Xiaowei Su
(74) *Attorney, Agent, or Firm* — Oliff PLC

(57) ABSTRACT

An R-T-B-based permanent magnet having improved magnetic properties contains R that represents at least one rare earth element essentially including Nd or Pr, T that represents at least one iron-group element essentially including Fe, B that represents boron, and M that represents at least one element selected from Ga, Al, Cu and Si. The R-T-B-based permanent magnet includes main-phase grains which include $R_2T_{14}B$ crystals and two-grain grain boundaries each of which exists between adjacent two of the main-phase grains. The average thickness of the two-grain grain boundaries is 5 to 50 nm inclusive. The area ratio of an $R_6T_{13}M$ compound in an arbitrary cross section is 0.50% or less (including 0%).

10 Claims, 4 Drawing Sheets

(51) Int. Cl.
*C22C 38/00* (2006.01)
*H01F 41/02* (2006.01)

(56) References Cited

U.S. PATENT DOCUMENTS

| | | | | |
|---|---|---|---|---|
| 2014/0132377 | A1* | 5/2014 | Nakajima | B22F 3/16 420/83 |
| 2014/0290803 | A1* | 10/2014 | Kato | H01F 1/0577 420/83 |
| 2014/0292454 | A1 | 10/2014 | Kato et al. | |
| 2015/0170810 | A1 | 6/2015 | Miwa et al. | |
| 2015/0179318 | A1* | 6/2015 | Fujikawa | C22C 38/02 420/83 |
| 2016/0042847 | A1* | 2/2016 | Nishiuchi | C22C 38/001 335/302 |
| 2016/0042848 | A1* | 2/2016 | Kuniyoshi | C22C 38/10 75/246 |
| 2016/0086701 | A1 | 3/2016 | Miwa et al. | |

FOREIGN PATENT DOCUMENTS

| | | | |
|---|---|---|---|
| JP | 2015-135935 | A | 7/2015 |
| JP | 6414059 | B2 | 10/2018 |
| WO | 2013/191276 | A1 | 12/2013 |
| WO | 2014/157448 | A1 | 10/2014 |

* cited by examiner

R-T-B BASED PERMANENT MAGNET AND METHOD FOR MANUFACTURING SAME

TECHNICAL FIELD

The present invention relates to an R-T-B based permanent magnet and a method of producing the R-T-B based permanent magnet.

BACKGROUND

An R-T-B based permanent magnet is known to have excellent magnetic properties. Also, an R-T-B based permanent magnet with even more enhanced magnetic properties is being developed.

Patent Document 1 discloses a sintered magnet having improved magnetic properties by having an amount of each component within a predetermined range, and particularly by lowering a B amount.

Patent Document 2 discloses an R-T-B based sintered magnet having a high coercivity particularly by controlling an R amount, a B amount, and a Ga amount within predetermined ranges.

Patent Document 3 discloses an R-T-B based sintered magnet having an excellent corrosion resistance and good magnetic properties by having a concentrated part such as a R—Co—Cu—N concentrated part in grain boundaries.

[Patent Document 1] WO 2013/191276

[Patent Document 2] WO 2014/157448

[Patent Document 3] JP Patent No. 6414059

SUMMARY

However, in recent years, downsizing, lighter weight, and higher efficiency are even more demanded for magnetic components used in wide range of purpose. Thus, further improved magnetic properties are demanded for an R-T-B based permanent magnet such as an R-T-B based sintered magnet and the like.

The object of the present invention is to obtain an R-T-B based permanent magnet with improved magnetic properties.

In order to attain the above object, the R-T-B based permanent magnet according to the present invention is an R-T-B based permanent magnet in which R represents one or more rare earth elements which essentially includes Nd and/or Pr, T represents one or more iron group elements which essentially includes Fe, and B represents boron; wherein

- the R-T-B based permanent magnet includes M which is one or more selected from Ga, Al, Cu, and Si; and
- the R-T-B based permanent magnet includes main phase grains made of $R_2T_{14}B$ crystals and two-grain boundaries existing between two adjacent main phase grains,
- an average thickness of the two-grain boundaries is 5 nm or more and 50 nm or less, and
- an area ratio of $R_6T_{13}M$ compounds in an arbitrary cross section is 0.50% or less (including 0%).

By having above mentioned characteristics, the R-T-B based permanent magnet according to the present invention achieves improved magnetic properties.

In order to achieve the above-mentioned object, a method of producing the R-T-B based permanent magnet according to the present invention including main phase grains made of $R_2T_{14}B$ crystals and two-grain boundaries existing between two adjacent main phase grains in which R represents one or more rare earth elements which essentially includes Nd and/or Pr, T represents one or more iron group elements which essentially includes Fe, and B represents boron; wherein

- the method of producing the R-T-B based permanent magnet includes steps of
- forming a molded body, and
- sintering the molded body adhered with a metal; and
- a standard Gibbs energy of formation for forming a metal carbide from the metal is lower than a standard Gibbs energy of formation for forming a rare earth element carbide from a rare earth element most included in the molded body as R.

The R-T-B based permanent magnet produced by the above-mentioned method achieves improved magnetic properties.

The metal may be one or more selected from Zr, Ti, Ta, Nb, V, and Cr.

The metal may be in a powder form.

The metal may be in a plate form.

The metal may be in a foil form.

DETAILED DESCRIPTION

Figure 1:
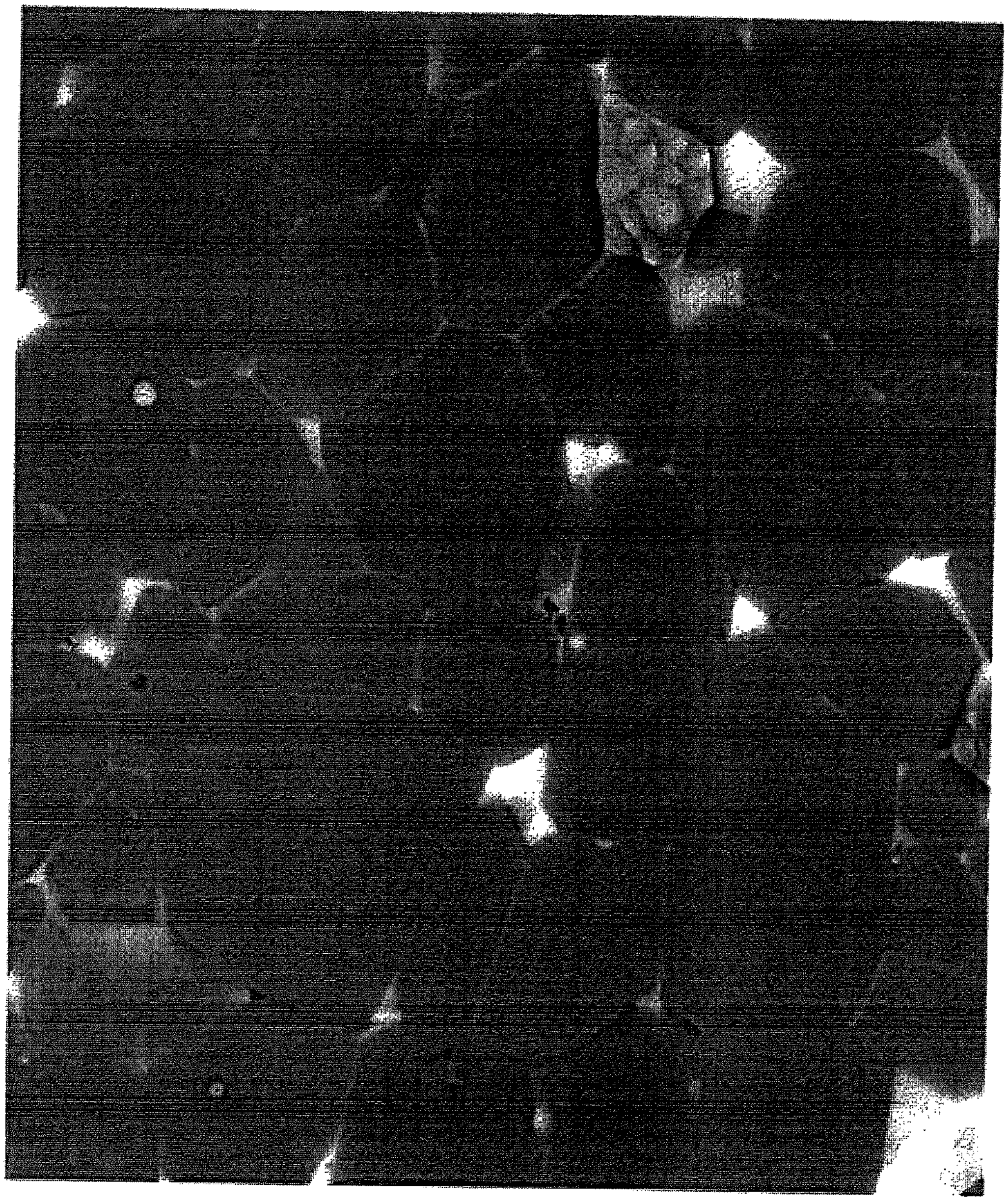
FIG. 1 is a SEM image of a cross section of an R-T-B based permanent magnet according to the present embodiment.

Hereinbelow, the present invention is described based on specific embodiments.

<R-T-B Based Permanent Magnet>

An R-T-B based permanent magnet according to the present embodiment includes main phase grains made of $R_2T_{14}B$ crystals and two-grain boundaries existing between two adjacent main phase grains. R represents one or more rare earth elements and R essentially includes Nd and/or Pr. T represents one or more iron group elements and T essentially includes Fe or a combination of Fe and Co. B represents boron. Note that, the rare earth elements included as R includes Sc, Y, and lanthanoid, which belong to a third group of a long period type periodic table. The iron group elements include Fe, Co, and Ni. Note that, grain sizes of the main phase grains made of $R_2T_{14}B$ crystals are not particularly limited. Usually, the grain sizes of the main phase grains are within a range of 1 μm or more and 10 μm or less.

In the R-T-B based permanent magnet according to the present embodiment, an area ratio of the $R_6T_{13}M$ compounds in an arbitrary cross section is 0.50% or less. The area ratio of the $R_6T_{13}M$ compounds may be 0.45% or less, and may preferably be 0.15% or less. Further, the area ratio of the $R_6T_{13}M$ compounds may be 0%. That is, the R-T-B based permanent magnet may not include the $R_6T_{13}M$ compounds. Also, the $R_6T_{13}M$ compounds have $La_6Co_{11}Ga_3$ type crystal structures; and the $R_6T_{13}M$ compounds refers to compounds having R, T, and M in an atomic ratio of R:T:M of about 6:13:1.

An area ratio of the $R_6T_{13}M$ compounds in the R-T-B based permanent magnet can be measured for example by using Scanning Electron Microscope (SEM). First, the R-T-B based permanent magnet is cut at an arbitrary cross section and then polished. Within the cross section, a size of an observation field is determined so that at least 200 or so or preferably 250 or so of the main phase grains are observed in the observation field under the magnification of 1000× or higher and 5000× or lower. The cross section is observed by SEM, and the $R_6T_{13}M$ compounds are identified by a backscattered electron image obtained from SEM, then the area ratio of the $R_6T_{13}M$ compounds is calculated. Specifically, the backscattered electron image obtained from SEM is analyzed by an image analysis software to obtain the area ratio of the $R_6T_{13}M$ compounds. In general, in the backscattered electron image, an area containing many elements of small atomic number appears dark; and an area containing many elements of large atomic number appears bright. For example, an area in the grain boundaries containing many rare earth elements such as R-rich phases which is described in below appears bright. Also, the main phase grains made of the $R_2T_{14}B$ crystals appears dark. Further, contrast of the $R_6T_{13}M$ compounds is somewhere between contrast of the main phase grains and the R-rich phases. Also, whether a compound showing contrast of the backscattered electron image between contrast of the main phase grains and the R-rich phases is a $R_6T_{13}M$ compound or not can be determined by identifying each compound using various measurement methods. As such various measurement methods, SEM (Scanning Electron Microscope)-EDS (Energy Dispersive X-ray Spectroscopy), TEM (Transmission Electron Microscope)-SAED (Selected Area Electron Diffraction)-EDS (Energy Dispersive X-ray Spectroscopy), and EPMA (Electron Probe Microanalyzer) may be mentioned.

The above-mentioned analysis is performed to backscattered electron images of five different observation fields in the cross section of the R-T-B based permanent magnet, then an area ratio of the $R_6T_{13}M$ compounds in each backscattered electron image is calculated. An average of the area ratio of the $R_6T_{13}M$ compounds from five different observation fields is defined as the area ratio of the $R_6T_{13}M$ compounds.

In the R-T-B based permanent magnet according to the present embodiment, an average thickness of the two-grain boundaries is 5 nm or more and 50 nm or less. Also, an average thickness of the two-grain boundaries may be 7 nm or more and 33 nm or less. The average thickness of the two-grain boundaries can be measured by HRTEM (High Resolution Transmission Electron Microscope).

Figure 4:
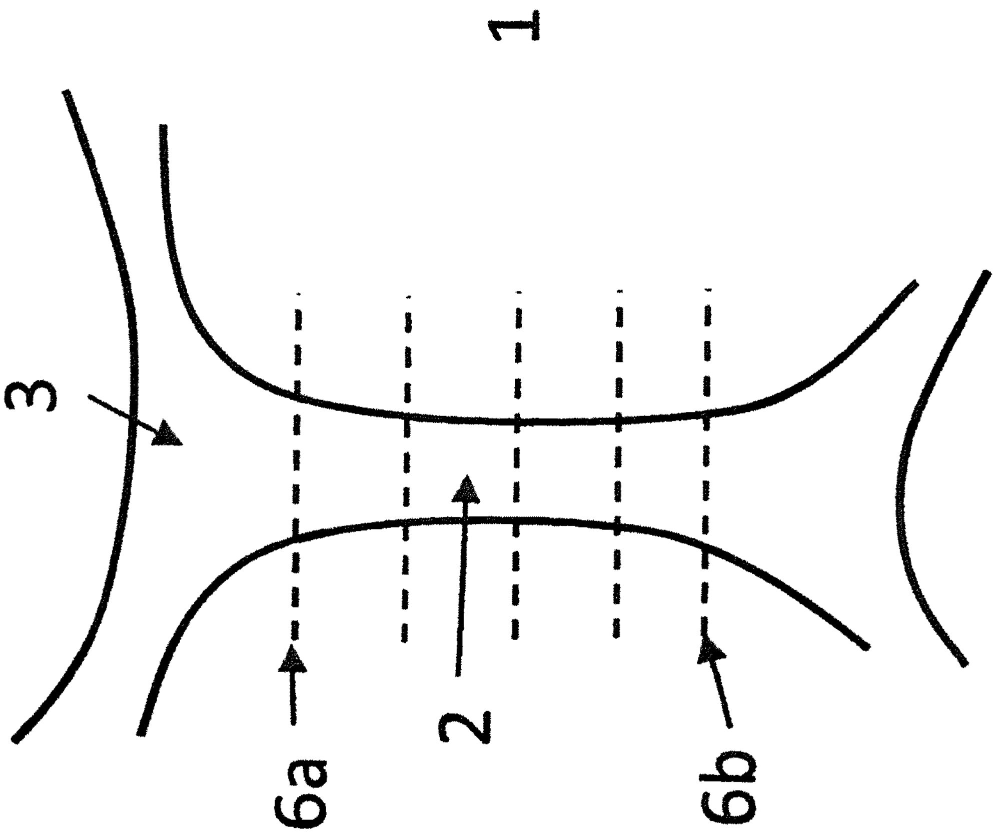
FIG. 4 is a schematic diagram explaining a method of measuring a thickness of two-grain boundaries.

Here, the average thickness of the two-grain boundaries is an average of measurement results of at least 60 positions. FIG. 4 is a schematic diagram showing a method of measuring a thickness of the two-grain boundaries according to the present embodiment. Two-grain boundaries 2 and triple junctions 3 are formed between a plurality of adjacent main phase grains 1. First, the two-grain boundaries 2 to measure the thicknesses are chosen. Then, borders 6*a*, 6*b* are determined which are the borders between the two-grain boundaries 2 and the triple junctions 3 which are connected with the two-grain boundaries 2. The borders 6*a*, 6*b* do not necessarily have to be determined precisely and these may be visually determined from HRTEM image. This is because the thickness of the two-grain boundaries is not measured near the borders 6*a*, 6*b*.

After the borders 6*a*, 6*b* are determined, three lines are drawn to divide space between the border 6*a* and the border 6*b* into four equal parts. The thickness of two-grain boundary is measured at the position where the three lines are drawn. That is, for one two-grain boundary 2, the thickness is measured at three positions. This measurement is performed at least to 20 two-grain boundaries 2, and an average of the obtained thicknesses of the two grain boundaries are calculated. Thereby, the average thickness of the two-grain boundaries is obtained.

The R-T-B based permanent magnet according to the present embodiment has the area ratio of the $R_6T_{13}M$ compounds of 0.50% or less and the average thickness of the two-grain boundaries of 5 nm or more ad 50 nm or less. Since the area ratio of the two-grain boundaries is 0.50% or less, subphases other than main phase grains in the R-T-B based permanent magnet are decreased. As a result, a residual magnetic flux density improves. Also, since the average thickness of the two-grain boundaries is thick, a coercivity increases. Note that, when the average thickness of the two-grain boundaries is too thick, the coercivity tends to further improve. However, a volume fraction of the two-grain boundaries in the R-T-B based permanent magnet increases, hence the residual magnetic flux density tends to decrease easily.

As clearly shown in SEM image of FIG. 1, in the R-T-B based permanent magnet according to the present embodiment, the triple junctions and subphases are small, and the two-grain boundaries are formed.

Figure 2:
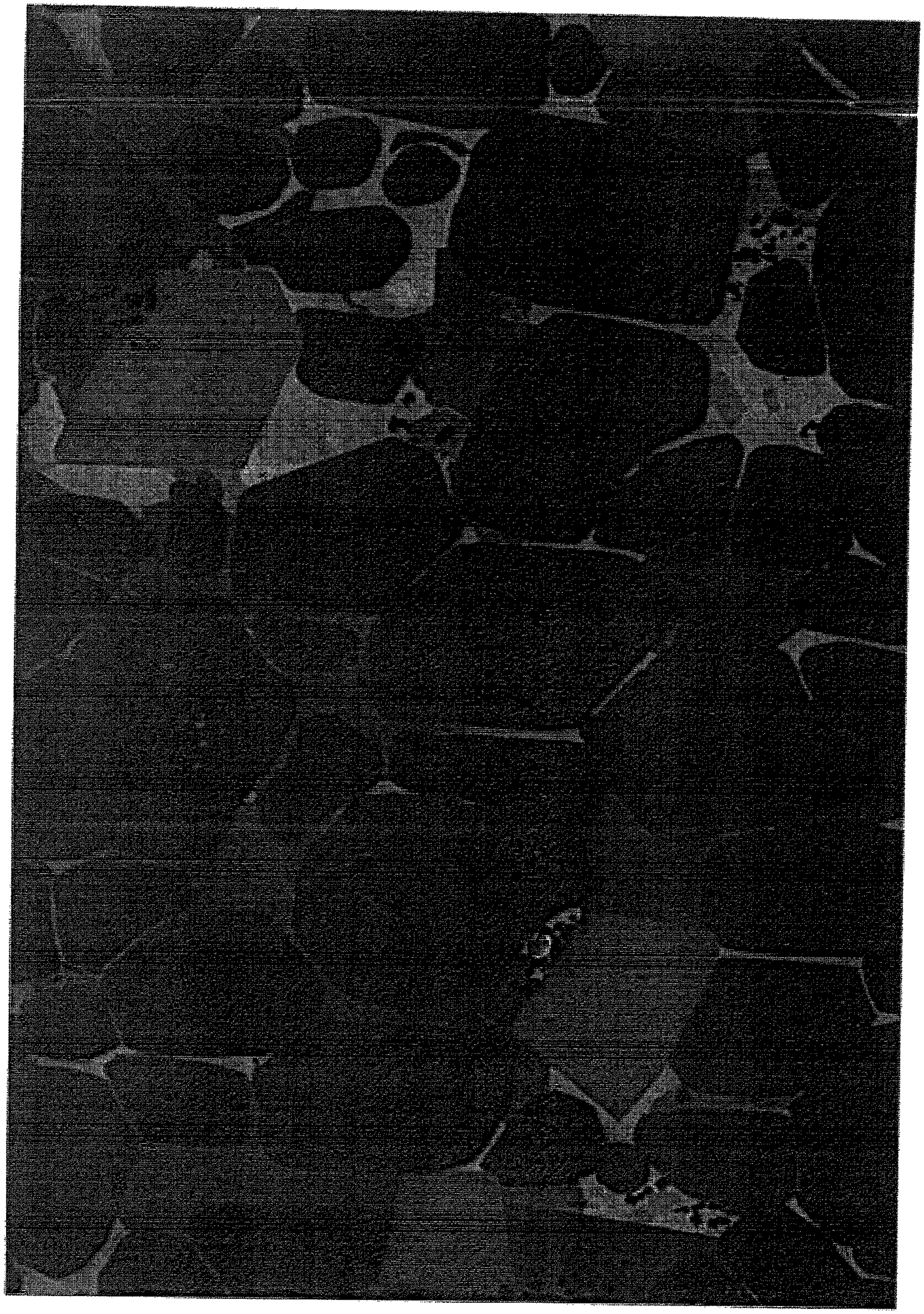
FIG. 2 is a SEM image of a cross section of a conventional R-T-B based permanent magnet having thick two-grain boundaries.

On the contrary to this, a conventional R-T-B based permanent magnet shown in FIG. 2 clearly shows the two-grain boundaries in the SEM image, however sizes of the triple junctions and the subphases are large. As a result, the residual magnetic flux density tends to decrease easily. Note that, a structure shown in FIG. 2 is a common structure for the R-T-B based permanent magnet having a low B amount of less than 0.95 mass % and a large Ga amount of 0.20 mass % or more.

Figure 3:
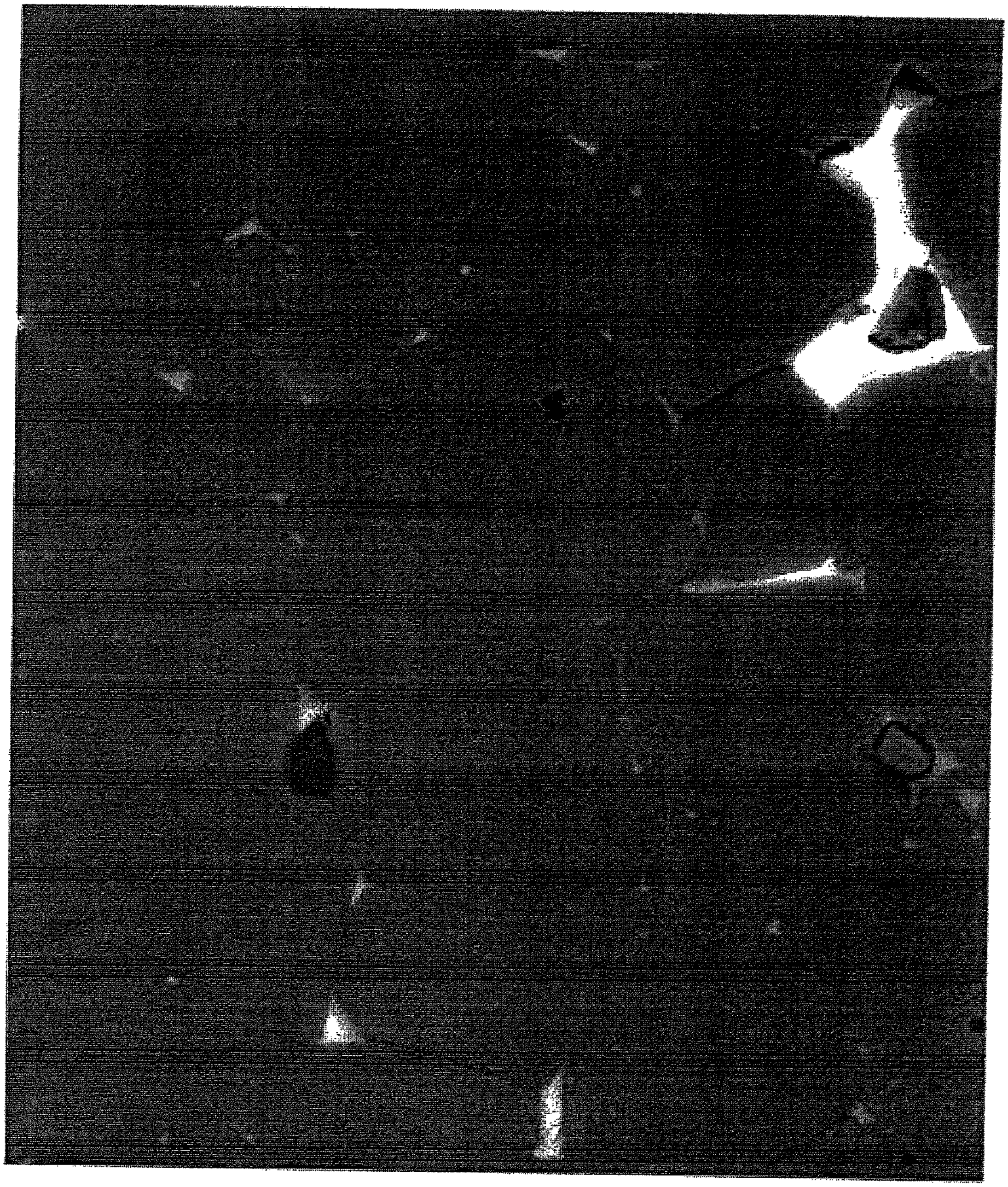
FIG. 3 is a SEM image of a cross section of a conventional R-T-B based permanent magnet having thin two-grain boundaries.

Also, regarding a conventional R-T-B based permanent magnet shown in FIG. 3, the two-grain boundaries are too thin to be verified in the SEM image. As a result, the coercivity tends to decrease easily. Note that, a structure shown in FIG. 3 is a common structure for the R-T-B based permanent magnet having a large B amount of 0.95 mass % or more, and a small Ga amount of less than 0.20 mass %. Also, even if the R amount in the R-T-B based permanent magnet is increased, the two-grain boundaries does not become thick but the sizes of the triple junctions and subphases tend to become large.

The R-T-B based permanent magnet according to the present embodiment at least includes Nd and/or Pr as R. Further preferably, Nd is at least included as R. Also, the R-T-B based permanent magnet according to the present embodiment may include at least one heavy rare earth element as R. The R-T-B based permanent magnet permanent magnet having high magnetic properties can be obtained even if the amount of the heavy rare earth element is low. Specifically, the amount of the heavy rare earth element may be 1.0 mass % or less (including 0 mass %). Also, the amount of the heavy rare earth element is preferably 0.50 mass % or less, and more preferably 0.10 mass % or less. The R-T-B based permanent magnet according to the present embodiment can attain a high coercivity even if the amount of the heavy rare earth element is reduced, thus the amount of the heavy rare earth element can be decreased.

The R amount is not particularly limited, and it may be 25 mass % or more and 35 mass % or less. When the R amount is 25 mass % or more, the $R_2T_{14}B$ crystals which become the main phase grains are formed sufficiently, and a-Fe and the like having a soft magnetic property is suppressed from forming, thus a decrease of the magnetic properties is easily suppressed. When the R amount is 35 mass % or less, the residual magnetic flux density tends to improve. The R amount may be 29.0 mass % or more and 32.5 mass % or less.

The B amount in the R-T-B based permanent magnet according to the present embodiment may be 0.50 mass % or more and 1.5 mass % or less. The B amount may preferably be 0.85 mass % or more and 1.05 mass % or less. When the B amount is too small, an area ratio of the triple junctions and the subphases including carbon tend to increase easily. Further, the area ratio of the $R_6T_{13}M$ compounds tend to increase easily. As a result, the residual magnetic flux density tends to decrease easily. Further, when the heavy rare earth element is diffused by a grain boundary diffusion process, particularly when Tb is diffused to the grain boundaries, Tb tends to be concentrated in the grain boundaries. As a result, the effect of increasing the coercivity due to the grain boundary diffusion of Tb cannot be achieved efficiently, and the residual magnetic flux density tends to decrease easily.

T may be Fe only, or Fe may be partially substituted by Co. T may include Ni. A Fe amount in the R-T-B based permanent magnet according to the present embodiment may be a substantial remainder excluding inevitable impurities in the R-T-B based permanent magnet. A Co amount may preferably be 0 mass % or more 4 mass % or less, and it may be 0.20 mass % or more and 3.0 mass % or less. When the Co amount is 0.20 mass % or less, the corrosion resistance tends to decrease easily. When Co amount is more than 3.0 mass %, properties such as the corrosion resistance and the like tend to less improve compared to the case having 3.0 mass % or less of the Co amount. Further, the cost increases.

The R-T-B based permanent magnet according to the present embodiment may include Ga, Al, Cu, and/or Si as an element M other than R, T, and B. Also, the R-T-B based permanent magnet according to the present embodiment may preferably include at least Al and/or Cu. An amount of each element is not particularly limited. For example, the total amount of M may be 0.50 mass % or less, or 0.30 mass % or less. Further, the total amount of M may be 0 mass %, or it may preferably be 0.10 mass % or more. Note that, Ga amount may preferably be 0.20 mass % or less.

When the M content is large, an area ratio of the triple junctions and the subphases including carbon tends to increase easily, and also the area ratio of $R_6T_{13}M$ compounds tend to increase easily. As a result, the residual magnetic flux density tends to decrease easily. Further, when the heavy rare earth element is diffused by a grain boundary diffusion process, particularly when Tb is diffused to the grain boundaries, Tb tends to be concentrated in the grain boundaries. As a result, an effect of improving the coercivity which is due to the grain boundary diffusion of Tb becomes difficult to achieves efficiently, and the residual magnetic flux density tends to decrease easily. When the M amount is too small, the magnetic properties (particularly of HcJ and squareness ratio) tend to vary largely in response to changes in the production conditions. As a result, the magnetic properties of the mass produced magnets tend to vary more. That is, a production stability decreases.

The R-T-B based permanent magnet according to the present embodiment may include Zr as an element other than R, T, B, and M. A Zr amount in case the R-T-B based permanent magnet includes Zr may preferably be 1.5 mass % or less with respect to 100 mass % of the R-T-B based permanent magnet as a whole. By including Zr in the R-T-B based permanent magnet, an abnormal grain growth of a main phase grain in sintering as a step of production can be suppressed. A sintered body (sintered magnet) obtained by sintering can have a uniform and fine structure, thus the magnetic properties can be improved. The Zr amount may be within a range of 0.03 mass % to 0.25 mass %. Also, the R-T-B based permanent magnet according to the present embodiment may include Ti, Ta, Nb, V, and/or Cr as elements other than R, T, B, and M. When the R-T-B based permanent magnet includes these elements, the amount of the elements may be 1.0 mass % or less with respect to 100 mass % of the R-T-B based permanent magnet as a whole.

The R-T-B based permanent magnet according to the present embodiment may further include carbon as an element other than the above-mentioned elements. A carbon amount is not particularly limited, and the carbon amount may preferably be relatively low. For example, the carbon amount may preferably be 0.080 mass % or less with respect to 100 mass % of the R-T-B based permanent magnet as a whole. The lower limit of the carbon amount is not particularly limited, and for example it may be 0.020 mass % or more, and preferably it may be 0.040 mass % or more. When the carbon amount is decreased, a $R_2Fe_{17}$ compound which is a soft magnetic phase tends to easily form in the grain boundaries, and HcJ tends to decrease easily.

By making the carbon amount relatively low, Curie point is increased and a temperature characteristic can be improved. Also, the subphases made by R and C bonding can be suppressed from forming. As a result, the ratio of the R-rich phases which contribute to form the two-grain boundaries increase. Further, even if the amount of the $R_6T_{13}M$ compounds is low, the formation of the thick two-grain boundaries is facilitated. Further, when the heavy rare earth element is diffused by a grain boundary diffusion process, particularly when Tb is diffused to the grain boundaries, Tb tends to be concentrated in the grain boundaries. Further, the increase of the coercivity due to the grain boundary diffusion of Tb can be attained efficiently, and the residual magnetic flux density is easily maintained.

The R-T-B based permanent magnet according to the present embodiment may include inevitable impurities such as Mn, Ca, Cl, S, F, O, N, and the like as other elements in an amount of 0.001 mass % or more and 1.0 mass % or less.

<Method of Producing R-T-B Based Permanent Magnet>

Next, a method of producing the R-T-B based permanent magnet according to the present embodiment is described.

The method of producing the R-T-B based permanent magnet according to the present embodiment at least includes a step of forming a molded body, and a step of sintering the molded body adhered with a metal.

Hereinbelow, a method of producing the R-T-B based permanent magnet is described in detail, however a known method may be also used unless mentioned otherwise.

[Step of Preparing Raw Material Powder]

A raw material powder can be produced by a known method. In the present embodiment, the R-T-B based permanent magnet is produced by a one-alloy method which uses one type of raw material alloy mainly made of $R_2T_{14}B$ phases. However, the R-T-B based permanent magnet may also be produced by a two-alloy method which uses two types of raw material alloys.

First, raw material metals are prepared which corresponds to a composition of the raw material alloy according to the present embodiment, and the raw material alloy corresponding to the present embodiment is produced by the raw material metals. A method of producing the raw material alloy is not particularly limited. For example, the raw material alloy may be produced by a strip casting method.

After the raw material alloy is produced, the raw material alloy is pulverized (pulverization step). A pulverization step may be performed in two steps, or in one step. A method of pulverization is not particularly limited. For example, the pulverization step may be performed by a method using various pulverizers. For example, the pulverization step can be performed in two steps which is a coarse pulverization step and a fine pulverization step, and a hydrogen pulverization treatment can be used in the coarse pulverization step. Specifically, hydrogen is stored into the raw material alloy at room temperature, then dehydrogenation can be performed under Ar gas atmosphere in a temperature range of 400° C. or more and 650° C. or less for 0.5 hours or longer and 2 hours or shorter. Also, the fine pulverization step can be performed using a jet mill, a wet attritor, and the like after adding various lubricants such as oleic amide, zinc stearate, and the like to a coarse powder. A particle size of the obtained fine powder (raw material powder) is not particularly limited. For example, the fine pulverization may be performed so that the particle size (D50) of the fine powder (raw material powder) has a particle size within a range of 1 μm or more 10 μm or less.

Note that, the added amount of the above-mentioned lubricant may or may not be reduced in order to reduce the carbon amount included in the R-T-B based permanent magnet. The reason is described in below.

[Molding Step]

In the molding step, the fine powder (raw material powder) obtained by the pulverization step is molded into a predetermined shape. A method of molding is not particularly limited. In the present embodiment, the fine powder (raw material powder) is filled in a die and pressurized under a magnetic field.

Pressure of 30 MPa or more and 300 MPa or less may preferably be applied during the molding step. Magnetic field of 950 kA/m or more and 1600 kA/m or less may preferably be applied. The applied magnetic field is not limited to a static magnetic field, and it can be a pulse magnetic field. Also, the static magnetic field and the pulse magnetic field can be used together. A shape of a molded body obtained by molding the fine powder (raw material powder) is not particularly limited, and the shape of the R-T-B based permanent magnet can be any shape depending on the desired shape such as a rectangular parallelepiped shape, a flat plate shape, a columnar shape, and the like.

[Sintering Step]

A sintering step is a process in which the molded body is sintered in a vacuumed or inert gas atmosphere to obtain a sintered body. A sintering temperature needs to be adjusted depending on various conditions such as a composition, a pulverization method, an average of particle sizes, a particle size distribution, and the like. For example, sintering is carried out by heating the molded body in a vacuum or inert gas atmosphere at 1000° C. or higher and 1200° C. or lower for one hour or more to 10 hours or less. Thereby, a sintered body with high density (permanent magnet) can be obtained.

In the method of producing the R-T-B based permanent magnet according to the present embodiment, the metal is adhered to the molded body prior to sintering. A type of the metal is selected so that a standard Gibbs energy of formation for forming a metal carbide from the metal is lower than a standard Gibbs energy of formation for forming a rare earth element carbide (for example Nd) from a rare earth element most included in the sintered body. Also, the metal is preferably a pure metal, and a pure metal of one type may be used or pure metals of two or more types may be used. Note that, the rare earth element most included in the sintered body refers to a rare earth element which is included in the sintered body with a highest concentration.

As the metal adhered to the molded body, for example Zr, Ti, Ta, Nb, V, and Cr may be mentioned. Particularly, Zr may be preferably used.

A method of adhering the metal is not particularly limited. For example, a method of placing the molded body on a powder of the metal, a method of sprinkling a powder of the metal on the molded body, a method of embedding the molded body in a powder of the metal, a method of placing the molded body on a plate of the metal, a method of placing a plate of the metal on the molded body, a method of wrapping the molded body with a foil of the metal, a method of using a sintering tray constituted by the metal, a method of placing the molded body on a net of the metal, a method of forming a layer of the metal at least to part of the surface of the molded body by providing a powder of the metal to one or both of punch faces on bottom and top of a molding apparatus during the molding step, a method of coating the metal, a method of vapor depositing the metal, and the like may be mentioned. Further, the above-mentioned methods may be combined. Particularly, the methods using the powder of the metal may be preferably used.

Note that, the effect of reducing the amount of carbon of the sintered body by adhering the metal to the molded body is more enhanced when the metal is adhered to a surface with a large area among the surfaces of the molded body.

Also, in the method of using the foil of the metal, the metal can be easily adhered to all surfaces of the molded body prior to sintering, hence an adhered area can be increased easily. On the other hand, as sintering proceeds, a volume of the molded body decreases. Thus, the foil of the metal and the molded body loses adhesion between each other as sintering proceeds, hence the adhered area may decrease in some cases.

By sintering the molded body while the metal is adhered, carbon inside the molded body moves to the surface of the rare earth permanent magnet and the metal and carbon react with each other, then forms the metal carbide. However, the metal does not move to the inside of the magnet and remains on the surface of the magnet. As a result, the amount of carbon inside the rare earth permanent magnet can be reduced.

By reducing the carbon amount using this method, the residual magnetic flux density tends to hardly decrease compared to the method of reducing the carbon amount by reducing the lubricant. In case of recuing the lubricant, a crystal orientation tends to decrease easily during the molding step, and the residual magnetic flux density of the magnet obtained at the end tends to decrease easily. Therefore, the amount of the lubricant is preferably determined by considering the coercivity and the residual magnetic flux density of the desired magnet.

[Aging Treatment Step]

An aging treatment step is a step in which the sintered body (permanent magnet) after the sintering step is carried out with heat treatment at lower temperature than the sintering temperature. Temperature and time of the aging treatment are not particularly limited, and for example it may be performed in a temperature range of 450° C. or higher and 900° C. or lower for 0.2 hours or longer and 3 hours or shorter. Note that, this aging treatment step may be omitted.

Also, the aging treatment step may be performed in one-step or in two-step. In case of carrying out the aging treatment step in two-step, the first step may be performed in the temperature range of 700° C. or higher and 900° C. or lower for 0.2 hours or longer and 3 hours or shorter; and the second step may be performed in the temperature range of 450° C. or higher and 700° C. or lower for 0.2 hours or longer and 3 hours or shorter. The first step and the second step may be performed in a continuous manner, or it may be performed by cooling the temperature to room temperature after the first step and re-heated to perform the second step.

The metal adhered to the molded body is removed before or after the aging treatment. For example, the metal may be removed by polishing 50 μm or more from each surface of all surfaces of the R-T-B based sintered magnet including the surface adhered with the metal, or by polishing 50 μm or more from every surface adhered with the metal of the R-T-B based sintered magnet.

Hereinabove, the preferable embodiment of the R-T-B based permanent magnet according to the present embodiment has been described, however the R-T-B based permanent magnet according to the present invention is not limited thereto. The R-T-B based permanent magnet according to the present invention may have various different forms within the scope of the present invention and various combinations are possible within the scope of the present invention.

Further, a magnet obtained by cutting and dividing the R-T-B based permanent magnet according to the present embodiment can be used.

Specifically, the R-T-B based permanent magnet according to the present embodiment may be suitably used for a motor, a compressor, a magnetic sensor, a speaker, and the like.

Also, the R-T-B based permanent magnet according to the present embodiment may be used alone or by binding two or more of the R-T-B based permanent magnets depending on needs. A method of binding is not particularly limited. For example, a method of binding mechanically, a method of binding by a resin mold, and the like may be mentioned.

By binding two or more of the R-T-B based permanent magnets, a large R-T-B based permanent magnet can be easily obtained. The magnets obtained by biding two or more of the R-T-B based permanent magnets can be used when a particularly large R-T-B based permanent magnet is needed such as for an IPM motor, a wind mill generator, a large size motor, and the like.

EXAMPLES

Hereinafter, the present invention is described in further details based on specific examples, however the present invention is not limited thereto.

Experiment Example 1

(Step of Producing Permanent Magnet)

As raw material metals, Nd, electrolytic iron, low carbon ferroboron alloy were prepared. Further, Ga, Al, Cu, Co, and Zr were prepared in a form of pure metals or in a form of alloy with Fe.

A raw material alloy was produced from the above-mentioned raw material metals by a strip casting method so that a composition of a raw material powder obtained after fine pulverization described in below had a composition shown in Table 1 and Table 2. An amount of inevitable impurities in the raw material alloy was 1 mass % or less. Also, a thickness of the raw material alloy was 0.2 mm to 0.6 mm.

Note that, steps from hydrogen storage pulverization to a sintering step described in below were performed in low oxygen atmosphere which was constantly an oxygen concentration of less than 200 ppm.

Next, hydrogen was stored in the raw material alloy by flowing hydrogen gas for one hour under room temperature. Next, the atmosphere was changed to Ar gas atmosphere, and dehydrogenation was performed for 1 hour at 450° C. to carry out hydrogen pulverization of the raw material alloy. Further, the raw material alloy powder which was hydrogen pulverized was cooled, then a powder having a particle size of 400 μm or less was prepared by sieving.

Next, the powder of the raw material alloy after the hydrogen pulverization was added and mixed with 0.10% in mass ratio of oleic amide as a lubricant.

Subsequently, the obtained powder was finely pulverized in a nitrogen gas stream using an impact plate type jet mill apparatus, and a fine powder (raw material powder) having an average particle size of 4 μm or so was obtained. Note that, the average particle size was an average particle size D50 which was measured by a laser diffraction type particle size analyzer.

Note that, as the inevitable impurities and the like, H, Si, Ca, La, Ce, Cr, and the like may be detected. Si was mixed in from the ferroboron raw material and from a crucible while alloy was being melted. Ca, La, and Ce were mixed in from the raw materials of the rare earth elements. Also, Cr may be mixed in from electrolytic iron.

The obtained fine powder was molded in magnetic field to produce a molded body of a rectangular parallelepiped shape (length×width×thickness=20 mm×20 mm×15 mm). The applied magnetic field was static magnetic field of 1200 kA/m. Also, the pressure during molding was 120 MPa. Note that, the direction of applied magnetic field and the direction of pressurization were perpendicular to each other. When the density of the molded body was measured, the density of each molded body was within a range between 4.10 Mg/cm$^3$ or more and 4.25 Mg/m$^3$ or less.

Next, the metal shown in Table 1 was adhered to the molded body before the molded body was sintered. Note that, for Comparative example No. 1, 2, and 4, the molded body was sintered without the metal adhered to the molded body.

When the metal was in a form of powder, 3 mass % of the metal powder was adhered to 100 mass % of the molded body. Specifically, to two faces of the molded body having the largest surfaces, that is, two faces each having an area of 20 mm×20 mm were adhered with 1.5 mass % of the metal powder per each surface. Also, the metal powder was adhered uniformly to each surface. Note that, for Example No. 13, the metal powder was obtained by mixing Zr and Ti in a weight ratio of 66:34 then the metal powder was adhered to the molded body.

When the metal was in a form of plate, the metal plate having a thickness of 1 mm was adhered to the molded body. Specifically, the metal plate was adhered to entire two faces having the largest areas of the molded body.

When the metal was in a foil, a metal foil having a thickness of 10 μm was adhered. Specifically, the metal foil was wrapped around the molded body so that all faces of the molded body were adhered with the metal foil.

Next, the molded body was sintered to obtain the permanent magnet. Sintering conditions were 1060° C. for 4 hours. Sintering atmosphere was vacuum atmosphere. The density of the sintered body was within a range of 7.50 Mg/m$^3$ or more and 7.55 Mg/m$^3$ or less. Then, a first aging treatment was performed in Ar atmosphere under atmospheric pressure at a first aging treatment temperature of 900° C. for one hour; and a second aging treatment was performed in Ar atmosphere under atmospheric pressure at a second aging treatment temperature of 500° C. for one hour.

Then, residues and surface roughness caused by sintering and the metal adhered to the molded body were removed from the obtained permanent magnet. Specifically, 50 μm was polished per each surface of all surfaces of the permanent magnet.

The composition of the obtained permanent magnet was evaluated by a fluorescence X-ray analysis. Note that, B amount was evaluated by ICP, and a carbon amount was evaluated by a combustion in oxygen stream-infrared absorption method. As a result, a composition of the raw material alloy other than the carbon amount was confirmed to be substantially the same as a composition of the obtained permanent magnet. That is, almost all of the adhered metal was removed by above-mentioned polishing, and the metal was substantially not included in the permanent magnet. The carbon amount is shown in Table 1.

Magnetic properties (a residual magnetic flux density Br and a coercivity HcJ) of the obtained permanent magnet were evaluated by a BH tracer. For the present experiment examples, the coercivity of 1230 kA/m or more was considered good, and the residual magnetic flux density of 1400 mT or more was considered good.

Regarding the obtained permanent magnet, an area ratio of the $R_6T_{13}M$ compounds was measured. A cross section of the obtained permanent magnet was observed by SEM, and the area ratio of the $R_6T_{13}M$ compounds was calculated. Note that, the observation field was 0.25 mm×0.25 mm. Also, the observation field was confirmed to contain at least 1200 main phase grains. Results are shown in Table 1. In Table 1, some samples are indicated with N.D. which means that the area ratio of the $R_6T_{13}M$ compounds was below 0.10% which is below detection limit.

An average thickness of the two-grain boundaries was measured by observing the above-mentioned cross section using HRTEM and using the above-mentioned method. Results are shown in Table 1.

TABLE 1

| | Composition of raw material powder | Metal adhered to molded body during sintering: Type of metal | Metal adhered to molded body during sintering: Form of metal | Average thickness of two-grain boundaries nm | Area ratio of $R_6T_{13}$ compounds % | Carbon amount mass % | Br mT | HcJ kA/m |
|---|---|---|---|---|---|---|---|---|
| Comparative example 1 | Composition 1 | None | — | 2 | 0.10 | 0.089 | 1460 | 1210 |
| Comparative example 2 | Composition 2 | None | — | 19 | 0.95 | 0.115 | 1390 | 1350 |
| Comparative example 3 | Composition 1 | W | powder | 2 | N.D. | 0.088 | 1460 | 1210 |
| Comparative example 4 | Composition 3 | None | — | 4 | 0.20 | 0.101 | 1430 | 1220 |
| Example 1 | Composition 1 | Zr | powder | 33 | 0.10 | 0.063 | 1460 | 1450 |
| Example 2 | Composition 1 | Zr | foil | 24 | 0.10 | 0.071 | 1465 | 1345 |
| Example 3 | Composition 1 | Zr | plate | 19 | 0.10 | 0.070 | 1465 | 1355 |
| Example 4 | Composition 1 | Ti | powder | 15 | 0.15 | 0.071 | 1465 | 1300 |
| Example 5 | Composition 1 | Ti | foil | 10 | 0.15 | 0.076 | 1460 | 1245 |
| Example 6 | Composition 1 | Ti | plate | 12 | 0.15 | 0.073 | 1465 | 1250 |
| Example 7 | Composition 1 | Ta | powder | 18 | 0.10 | 0.069 | 1460 | 1405 |
| Example 8 | Composition 1 | Ta | foil | 14 | N.D. | 0.074 | 1460 | 1305 |
| Example 9 | Composition 1 | Ta | plate | 15 | N.D. | 0.072 | 1460 | 1310 |
| Example 10 | Composition 1 | Nb | powder | 13 | N.D. | 0.071 | 1465 | 1320 |
| Example 11 | Composition 1 | Nb | foil | 7 | N.D. | 0.076 | 1460 | 1245 |
| Example 12 | Composition 1 | Nb | plate | 9 | N.D. | 0.075 | 1465 | 1265 |
| Example 13 | Composition 1 | Zr, Ti mixed powder | powder | 19 | 0.10 | 0.069 | 1460 | 1400 |
| Example 14 | Composition 4 | Zr | powder | 19 | 0.45 | 0.079 | 1435 | 1375 |

TABLE 2

| | Amount ratio (mass %) | | | | | | | |
|---|---|---|---|---|---|---|---|---|
| | R | T | | B | M | | | |
| | Nd | Fe | Co | B | Al | Cu | Si | Ga |
| Composition 1 | 31.0 | remainder | 0.50 | 1.00 | 0.20 | 0.10 | 0.00 | 0.00 |
| Composition 2 | 31.0 | remainder | 0.50 | 0.90 | 0.20 | 0.10 | 0.00 | 0.20 |
| Composition 3 | 31.0 | remainder | 0.50 | 0.95 | 0.10 | 0.10 | 0.00 | 0.10 |
| Composition 4 | 31.0 | remainder | 0.50 | 0.95 | 0.20 | 0.10 | 0.00 | 0.20 |

According to Table 1, Example No. 1 to 14 in which one or two selected from Zr, Ti, Ta, and Nb as the metal element were adhered to the molded body had a lower carbon amount compared to Comparative example No. 1, 2, and 4 in which the metal element was not adhered to the molded body and also compared to Comparative example No. 3 in which W as the metal element was adhered to the molded body. Further, the average thickness of the two-grain boundaries was within a range of 5 nm or more and 50 nm or less, and the area ratio of the $R_6T_{13}M$ compounds was 0.50% or less. Further, Br and HcJ were good.

Among Comparative example No. 1 to 4, Comparative example No. 1 and 3 which included relatively large B amount of 1.00 mass % and not included Ga had an increased amount of carbon. Further, as shown in FIG. 3, the average thickness of the two-grain boundaries was thin. As a result, HcJ decreased compared to Examples. Note that, even if an R amount was increased from the amount included in Comparative example No. 1 and 3, an area ratio of triple junctions tends to increase easily and it is difficult to achieve the average thickness of the two-grain boundaries having 5 nm or more.

Among Comparative example No. 1 to 4, Comparative example No. 2 which included a relatively low B amount of 0.90 mass % and a relatively large Ga amount of 0.20 mass % had an increased amount of carbon. Further, an area ratio of the triple junctions increased and an area ratio of the $R_6T_{13}M$ phases and the subphases including carbon increased. As a result, Br had decreased compared to Examples.

Among Comparative example No. 1 to 4, Comparative example No. 4 which included a B amount of 0.95 mass % and a Ga amount of 0.10 mass % had an increased amount of carbon and an average thickness of the two-grain boundaries was thin. As a result, HcJ decreased compared to Examples.

Note that, in Comparative example No. 3 in which W was adhered as the metal element, the obtained permanent magnet had an increased amount of carbon because a standard Gibbs energy of formation for forming W carbide from W was higher than a standard Gibbs energy of formation for forming Nd carbide from Nd. On the contrary to this, Example No. 1 to 14 had a low amount of carbon in the obtained permanent magnet because a standard Gibbs energy of formation for forming carbides from Zr, Ti, Ta, Nb was lower than a standard Gibbs energy of formation for forming Nd carbide from Nd.

Experiment Example 2

Experiment example 2 was carried out as similar to Experiment example 1, except that a composition 1 shown in Table 2 was used as a composition of a raw material powder and a type of metal adhered to the molded body while sintering was changed. Results are shown in Table 3.

TABLE 3

| | Composition of raw material powder | Metal adhered to molded body during sintering: Type of metal | Metal adhered to molded body during sintering: Form of metal | Average thickness of two-grain boundaries nm | Area ratio of $R_6T_{13}$ compounds % | Carbon amount mass % | Br mT | HcJ kA/m |
|---|---|---|---|---|---|---|---|---|
| Example 21 | Composition 1 | V | powder | 12 | 0.10 | 0.071 | 1465 | 1285 |
| Example 22 | Composition 1 | V | foil | 7 | 0.10 | 0.075 | 1460 | 1255 |
| Example 23 | Composition 1 | V | plate | 8 | 0.10 | 0.074 | 1460 | 1255 |
| Example 24 | Composition 1 | Cr | powder | 13 | 0.10 | 0.072 | 1465 | 1295 |
| Example 25 | Composition 1 | Cr | foil | 7 | 0.10 | 0.075 | 1460 | 1255 |
| Example 26 | Composition 1 | Cr | plate | 8 | 0.10 | 0.075 | 1460 | 1260 |

According to Table 3, Example No. 21 to 26 in which the type of the metal element was changed to V or Cr had a low carbon amount compared to Comparative example No. 1 to 4. Further, the average thickness of the two-grain boundaries was 5 nm or more, and an area ratio of the $R_6T_{13}M$ compounds was 0.50% or less. Also, Example No. 21 to 26 exhibited good Br and HcJ.

Experiment Example 3

Experiment example 3 was carried out as similar to Experiment example 1 except that a composition shown in Table 4 was used as a composition of a raw material powder. Results are shown in Table 4.

TABLE 4

| | Amount ratio (mass %) | | | | | | | | Average thickness of two-grain boundaries | Area ratio of $R_6T_{13}$ compounds | Carbon amount | Br | HcJ |
|---|---|---|---|---|---|---|---|---|---|---|---|---|---|
| | R | T | | B | M | | | | | | | | |
| | Nd | Fe | Co | B | Al | Cu | Si | Ga | nm | % | mass % | mT | kA/m |
| Example 31 | 29.0 | remainder | 0.50 | 1.00 | 0.20 | 0.10 | 0.00 | 0.00 | 25 | N.D. | 0.057 | 1475 | 1415 |
| Example 1 | 31.0 | remainder | 0.50 | 1.00 | 0.20 | 0.10 | 0.00 | 0.00 | 33 | 0.10 | 0.063 | 1460 | 1450 |
| Example 32 | 32.5 | remainder | 0.50 | 1.00 | 0.20 | 0.10 | 0.00 | 0.00 | 33 | 0.10 | 0.067 | 1415 | 1450 |
| Example 33 | 31.0 | remainder | 0.20 | 1.00 | 0.20 | 0.10 | 0.00 | 0.00 | 33 | 0.10 | 0.060 | 1460 | 1450 |
| Example 1 | 31.0 | remainder | 0.50 | 1.00 | 0.20 | 0.10 | 0.00 | 0.00 | 33 | 0.10 | 0.063 | 1460 | 1450 |
| Example 34 | 31.0 | remainder | 3.00 | 1.00 | 0.20 | 0.10 | 0.00 | 0.00 | 32 | 0.10 | 0.064 | 1460 | 1450 |
| Example 35 | 31.0 | remainder | 0.50 | 0.85 | 0.20 | 0.10 | 0.00 | 0.00 | 36 | 0.20 | 0.079 | 1410 | 1440 |
| Example 1 | 31.0 | remainder | 0.50 | 1.00 | 0.20 | 0.10 | 0.00 | 0.00 | 33 | 0.10 | 0.063 | 1460 | 1450 |
| Example 36 | 31.0 | remainder | 0.50 | 1.05 | 0.20 | 0.10 | 0.00 | 0.00 | 21 | N.D. | 0.059 | 1435 | 1430 |
| Example 37 | 31.0 | remainder | 0.50 | 1.00 | 0.10 | 0.10 | 0.00 | 0.00 | 33 | N.D. | 0.064 | 1460 | 1440 |
| Example 1 | 31.0 | remainder | 0.50 | 1.00 | 0.20 | 0.10 | 0.00 | 0.00 | 33 | 0.10 | 0.063 | 1460 | 1450 |
| Example 38 | 31.0 | remainder | 0.50 | 1.00 | 0.40 | 0.10 | 0.00 | 0.00 | 32 | 0.20 | 0.063 | 1415 | 1450 |
| Example 39 | 31.0 | remainder | 0.50 | 1.00 | 0.20 | 0.05 | 0.00 | 0.00 | 24 | N.D. | 0.069 | 1460 | 1440 |
| Example 1 | 31.0 | remainder | 0.50 | 1.00 | 0.20 | 0.10 | 0.00 | 0.00 | 33 | 0.10 | 0.063 | 1460 | 1450 |
| Example 40 | 31.0 | remainder | 0.50 | 1.00 | 0.20 | 0.20 | 0.00 | 0.00 | 34 | 0.15 | 0.059 | 1450 | 1455 |
| Example 1 | 31.0 | remainder | 0.50 | 1.00 | 0.20 | 0.10 | 0.00 | 0.00 | 33 | 0.10 | 0.063 | 1460 | 1450 |
| Example 41 | 31.0 | remainder | 0.50 | 1.00 | 0.20 | 0.10 | 0.10 | 0.00 | 26 | 0.14 | 0.066 | 1455 | 1440 |
| Example 42 | 31.0 | remainder | 0.50 | 1.00 | 0.20 | 0.10 | 0.20 | 0.00 | 22 | 0.19 | 0.068 | 1455 | 1440 |
| Example 1 | 31.0 | remainder | 0.50 | 1.00 | 0.20 | 0.10 | 0.00 | 0.00 | 33 | 0.10 | 0.063 | 1460 | 1450 |
| Example 43 | 31.0 | remainder | 0.50 | 1.00 | 0.20 | 0.10 | 0.00 | 0.10 | 25 | 0.15 | 0.067 | 1455 | 1440 |
| Example 44 | 31.0 | remainder | 0.50 | 1.00 | 0.20 | 0.10 | 0.00 | 0.20 | 21 | 0.20 | 0.069 | 1455 | 1440 |

According to Table 4, even when the composition of the raw material powder was changed, Example No. 31 to 44 had a low amount of carbon compared to Comparative example No. 1 to 4. Further, the average thickness of the two-grain boundaries was within a range of 5 nm or more and 50 nm or less and an area ratio of the $R_6T_{13}M$ compounds was 0.50% or less. Also, good Br and HcJ were exhibited.

Note that, Example No. 36 having a relatively large B amount had decreased Br and HcJ compared to Example No. 1 which was carried out under the same conditions except for the B amount. This is because when B amount was too large, subphases such as boride of a rare earth element tended to form easily.

Experiment Example 4

Experiment example 4 was carried out as similar to Experiment example 1 except that the amount of the metal powder was changed. Results are shown in Table 5.

TABLE 5

| | Powder amount mass % | Average thickness of two-grain boundaries nm | Area ratio of $R_6T_{13}$ compounds % | Carbon amount mass % | Br mT | HcJ kA/m |
|---|---|---|---|---|---|---|
| Comparative example 1 | 0.0 | 2 | 0.10 | 0.089 | 1460 | 1210 |
| Example 51 | 1.0 | 11 | 0.10 | 0.080 | 1460 | 1275 |
| Example 52 | 2.0 | 18 | 0.10 | 0.075 | 1460 | 1350 |
| Example 1 | 3.0 | 33 | 0.10 | 0.063 | 1460 | 1450 |
| Example 53 | 5.0 | 47 | 0.10 | 0.055 | 1435 | 1460 |
| Comparative example 51 | 10.0 | 58 | 0.15 | 0.035 | 1370 | 1440 |

According to Table 5, as the amount of the metal powder increased, the carbon amount decreased and the average thickness of the two-grain boundaries increased. Further, Examples having the average thickness of the two-grain boundaries within a range of 5 nm or more and 50 nm or less had a low amount of carbon compared to Comparative example No. 1 to 4. Also, an area ratio of the $R_6T_{13}M$ compounds was 0.50% or less. Also, good Br and HcJ were exhibited. Note that, in Comparative example No. 1, and Example No. 1 and 51 to 53, HcJ decreased as the amount of the metal powder decreased. This is because as the amount of the metal powder decreased, the effect of reducing the amount ratio of carbon in the rare earth permanent magnet decreased, and the average thickness of the two-grain boundaries tended to become thinner.

On the contrary to this, in Comparative example No. 51, the average thickness of the two-grain boundaries was too thick. Thus, Br decreased. Also, in Comparative example No. 51, as the carbon amount decreased, an area ratio of the $R_6T_{13}M$ compounds increased and $R_2Fe_{17}$ compounds were formed in the grain boundaries. As a result, HcJ decreased compared to Example No. 1 and 53.

NUMERICAL REFERENCES

1 . . . Main phase grains
2 . . . Two-grain boundaries
3 . . . Triple junctions
6*a*,6*b* . . . Borders

What is claimed is:

1. An R-T-B based permanent magnet in which R represents one or more rare earth elements and essentially includes Nd and/or Pr, T represents one or more iron group elements and essentially includes Fe, and B represents boron, wherein the iron group elements refer to Fe, Co and Ni; wherein the R-T-B based permanent magnet includes M which is one or more selected from Ga, Al, Cu, and Si; and the R-T-B based permanent magnet comprises main phase grains made of $R_2T_{14}B$ crystals and two-grain boundaries existing between two adjacent main phase grains, a carbon amount is 0.020 mass % or more and 0.080 mass % or less with respect to 100 mass % of the R-T-B based permanent magnet as a whole, an amount of heavy rare earth elements is 0 mass % with respect to 100 mass % of the R-T-B based permanent magnet as a whole, a residual magnetic flux density of the R-T-B based permanent magnet is 1435 mT or more, a coercivity of the R-T-B based permanent magnet is 1230 kA/m or more, an average thickness of the two-grain boundaries is 5 nm or more and 50 nm or less, and an area ratio of $R_6T_{13}M$ compounds in an arbitrary cross section is 0.50% or less, including 0%.

2. The R-T-B based permanent magnet according to claim 1, wherein a Ga amount of the R-T-B based permanent magnet is 0.0 mass %.

3. The R-T-B based permanent magnet according to claim 1, wherein the average thickness of the two-grain boundaries is 25 nm or more and 50 nm or less.

4. The R-T-B based permanent magnet according to claim 1, wherein the average thickness of the two-grain boundaries is 7 nm or more and 47 nm or less.

5. The R-T-B based permanent magnet according to claim 1, wherein the area ratio of $R_6T_{13}M$ compounds is 0.15% or less, including 0%.

6. The R-T-B based permanent magnet according to claim 1, wherein an R amount of the R-T-B based permanent magnet with respect to 100 mass % of the R-T-B based permanent magnet as a whole is 25 mass % or more and 35 mass % or less.

7. The R-T-B based permanent magnet according to claim 1, wherein a B amount with respect to 100 mass % of the R-T-B based permanent magnet as a whole is 0.50 mass % or more and 1.5 mass % or less.

8. The R-T-B based permanent magnet according to claim 1, wherein a Co amount with respect to 100 mass % of the R-T-B based permanent magnet as a whole is 0 mass % or more and 4 mass % or less.

9. The R-T-B based permanent magnet according to claim 1, wherein a total amount of M of the R-T-B based permanent magnet is 0.10 mass % or more and 0.50 mass % or less.

10. The R-T-B based permanent magnet according to claim 1, wherein the R-T-B based permanent magnet optionally includes Zr as an element other than R, T, B, and M, and an amount of Zr with respect to 100 mass % of the R-T-B based permanent magnet as a whole is 1.5 mass % or less, including 0 mass %.

* * * * *